US007212595B2

(12) United States Patent
Tung et al.

(10) Patent No.: US 7,212,595 B2
(45) Date of Patent: May 1, 2007

(54) REDUCED COMPLEXITY TIME-FREQUENCY TRAINED EQUALIZER FOR DISCRETE MULTI-TONE BASED DSL SYSTEMS

(75) Inventors: Tai-Lai Tung, Irvine, CA (US); Mike Tu, Irvine, CA (US)

(73) Assignee: Conexant, Inc., Red Bank, NJ (US)

( * ) Notice: Subject to any disclaimer, the term of this patent is extended or adjusted under 35 U.S.C. 154(b) by 703 days.

(21) Appl. No.: 10/408,364

(22) Filed: Apr. 8, 2003

(65) Prior Publication Data

US 2004/0202260 A1  Oct. 14, 2004

(51) Int. Cl.
*H04B 1/10* (2006.01)
(52) U.S. Cl. .................. 375/350; 375/232; 375/231; 375/264
(58) Field of Classification Search ........... 375/350, 375/229, 222, 231, 232, 264
See application file for complete search history.

(56) References Cited

U.S. PATENT DOCUMENTS

| 5,796,814 A * | 8/1998 | Brajal et al. ............ 375/232 |
| 6,535,552 B1 * | 3/2003 | Pessoa .................... 375/231 |
| 2001/0031016 A1 * | 10/2001 | Seagraves ................ 375/264 |

FOREIGN PATENT DOCUMENTS

EP  1158737 A2  11/2001
EP  1257105 A2  11/2002

OTHER PUBLICATIONS

Chow et al., "Equalizer Training Algorithms for Multicarrier Modulation Systems," Proceedings of The International Conference on Communications (ICC), May 23-26, 1993, vol. 3, pp. 761-765.
Cioffi, "*A Multicarrier Primer*," Amati Communications Corporation and Stanford University, www.isl.stanford.edu/people/cioffi/pdf/multicarrier.pdf, accessed on Apr. 2, 2002, pp. 1-18, USA.
Nafie et al., "*Time-Domain Equalizer Training for ADSL*," IEEE Int. Conf. on Communications, Jun. 8-12, 1997, Montreal Canada.
Silhavy, "*Channel Equalisation in ADSL transmission technology*," ElectronicLetters.com, Cesky Content, ISSN 1213-161X, Paper No. Mar. 11, 2002, pp. 1-8.

* cited by examiner

*Primary Examiner*—Chieh M. Fan
*Assistant Examiner*—Eva Zheng
(74) *Attorney, Agent, or Firm*—Thomas, Kayden, Horstemeyer & Risley

(57) ABSTRACT

The present invention provides a system and method for implementing a new TEQ training approach that trains TEQ coefficients by exploiting both time-domain and frequency-domain information. An advantage of this technique is that it reduces memory usage due to the training process. In addition, the complexity of the training process is simplified, and the associated computational work is reduced. The reduction of memory usage and computational work in turn may lead to cost savings, power consumption savings and other advantages.

22 Claims, 2 Drawing Sheets

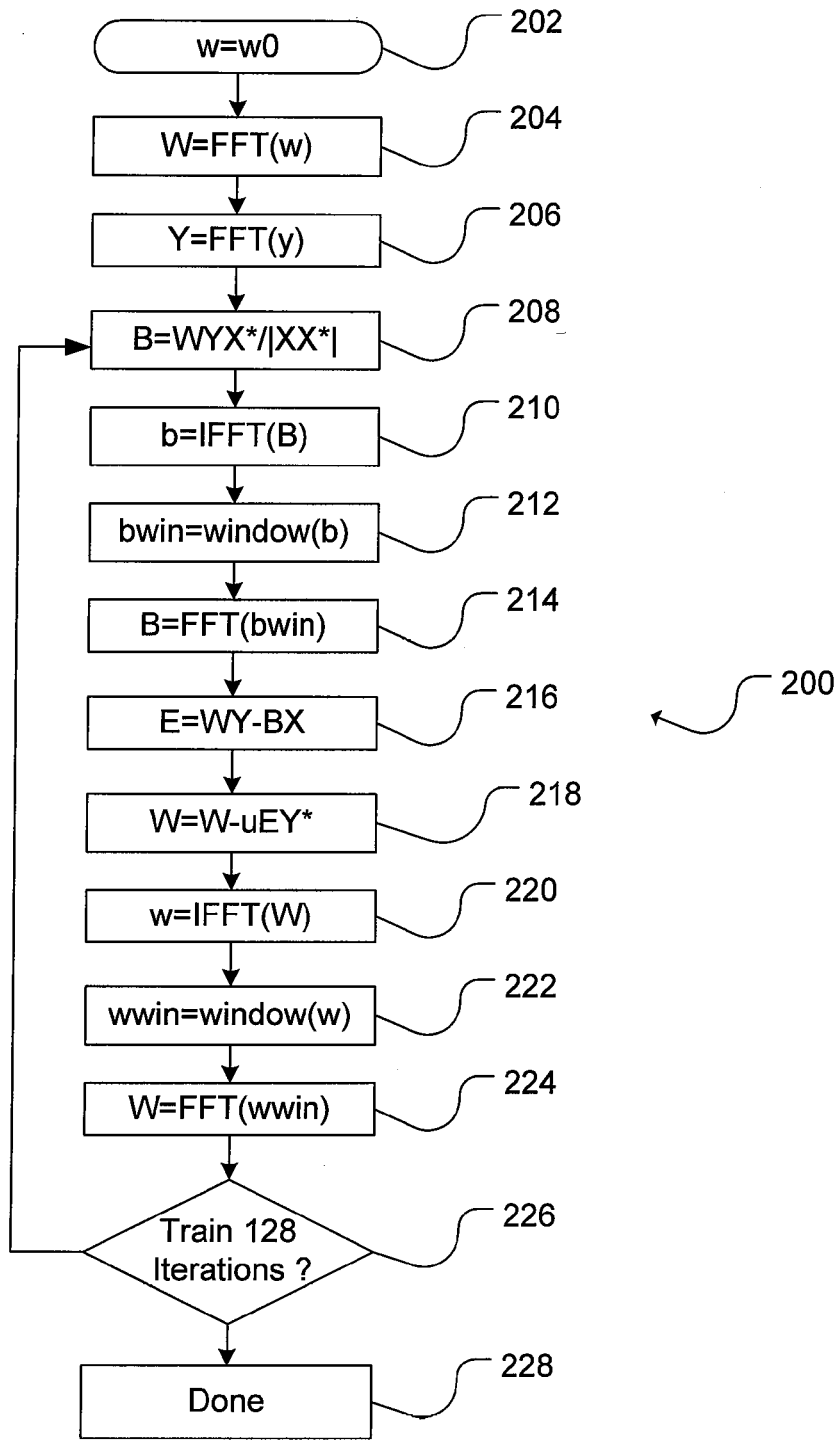

REDUCED COMPLEXITY TIME-FREQUENCY TRAINED EQUALIZER FOR DISCRETE MULTI-TONE BASED DSL SYSTEMS

BACKGROUND OF THE INVENTION

Discrete Multi-tone (DMT) is a common multicarrier modulation scheme that has been implemented in many Digital Subscriber Lines (DSL). As used herein "xDSL" is understood to denote any type of DSL service (e.g., ADSL, DMT-based VDSL, etc.).

In a DMT-based xDSL system, Time Domain Equalization (TEQ) is typically used to reduce the delay spread of the twisted copper line channel such that the equalized channel impulse response can be accommodated by the length of the cyclic prefix. When the delay spread of equalized channel is smaller than the length of the cyclic prefix, not only can the intersymbol interference (ISI) be reduced in the time domain, but also the interchannel interference (ICI) can be reduced in the frequency domain since the orthogonality between sub-bands is preserved.

In previous work, TEQ training is performed either purely in the time-domain or purely in the frequency-domain. This may be disadvantageous because of associated increases in memory usage, computational work and complexity. Other drawbacks of existing systems also exist.

SUMMARY OF THE INVENTION

The present invention provides, among other things, a system and method for implementing a new TEQ training approach that trains TEQ coefficients by exploiting both time-domain and frequency-domain information. An advantage of this technique is that it reduces memory usage due to the training process. In addition, the complexity of the training process is simplified, and the associated computational work is reduced. The reduction of memory usage and computational work in turn may lead to cost savings, power consumption savings and other advantages.

According to some embodiments, the invention provides a method for determining equalizer coefficients for channel equalization in DMT based xDSL systems. For example, the method may first comprise determining a impulse response value in a time domain. The method may further comprise applying windowing to the impulse response value to determine a windowed impulse response value. In addition, the method may comprise determining a residual error signal based upon the windowed impulse response value and adjusting an equalizer coefficient by an amount that is based upon the residual error signal.

In some embodiments the method may further comprise first transforming the residual error signal to a frequency domain to generate a transformed residual error signal, modifying the transformed residual error signal by an estimated channel response value to form an interim value, transforming the interim value to a time domain to generate a correction factor and adjusting the equalizer coefficient by an amount proportional to the correction factor. Transformation may be accomplished by Fast Fourier Transform (FFT) or Inverse Fast Fourier Transform (IFFT) as is appropriate.

Embodiments of the invention also provide a system for determining equalizer coefficients for channel equalization in Discrete-Multi-Tone based Digital Subscriber Line systems. Many of the modules described herein may be provided by software modules, firmware, circuitry or other methods to enable the associated functionality. For example, the system may comprise an impulse response module for determining a impulse response value in a time domain. The system may further comprise a windowing module for applying windowing to the impulse response value to determine a windowed impulse response value, a residual error module for determining a residual error signal based upon the windowed impulse response value and an equalizer coefficient module for adjusting an equalizer coefficient by an amount that is based upon the residual error signal.

According to some embodiments of the invention, the equalizer coefficient module may further comprise a first transformation module for transforming the residual error signal to a frequency domain to generate a transformed residual error signal, a modification module for modifying the transformed residual error signal by an estimated channel response value to form an interim value, a second transformation module for transforming the interim value to a time domain to generate a correction factor and wherein the equalizer coefficient module adjusts the equalizer coefficient by an amount proportional to the correction factor. In addition, transformation may be accomplished by FFT, WFFT or other suitable transformation.

BRIEF DESCRIPTION OF THE DRAWING FIGURES

FIG. 2 is a schematic flow diagram of a method for determining equalizer coefficients according to the prior art.

DETAILED DESCRIPTION OF THE DRAWING FIGURES

Figure 1:
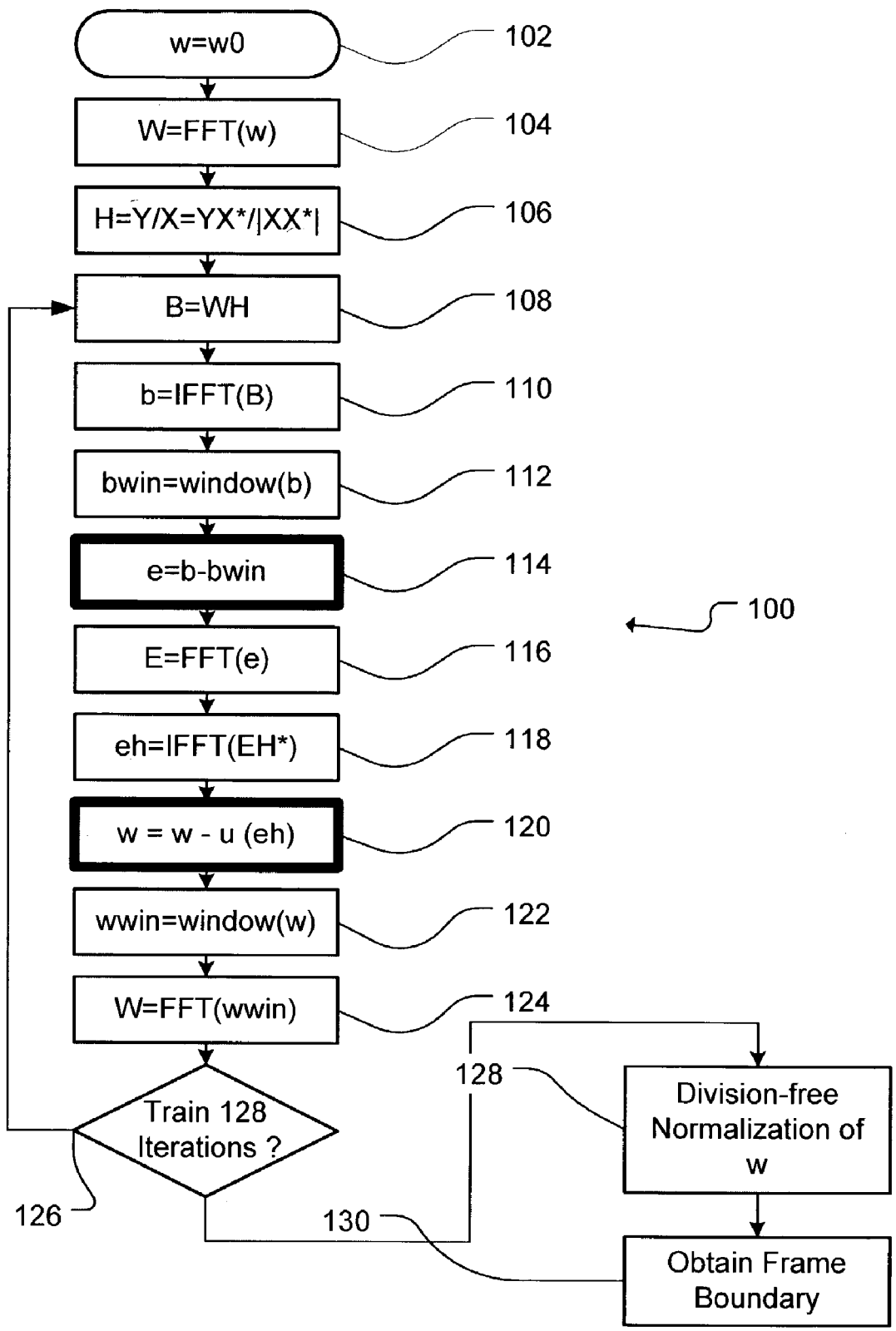
FIG. 1 is a schematic flow diagram of a method for determining equalizer coefficients according to embodiments of the invention.

The flow chart of a TEQ training process according to embodiments of the invention is shown in FIG. 1. As shown, the process (indicated generally at 100) may initiate as indicated at 102 by setting an equalizer coefficient variable (w) to an initial value (e.g., w=w0). As indicated at 104, the method may comprise performing an FFT on w to generate a frequency-based value W.

In some embodiments the process may further comprise determining an estimated channel value (H), as indicated at 106. One method of determining H may comprise dividing the received channel (Y) by a reference channel (X). For example, H may be determined from a calculation of Y multiplied by the complex conjugate of X (i.e., X*) and normalized by the absolute value of XX*. Other methods of determining H are possible.

Once H is determined, the method may further comprise determining a target value for the frequency response of the channel (B) as indicated at 108. For example, B may be determined by multiplying the determined values for H and W (i.e., B=WH)

As indicated at 110, B may be transformed to a time domain. For example, an IFFT may be used to transform B to a time based domain value (b). Other transformation techniques may also be used.

Windowing techniques may be used to optimize b. For example, as indicated at 112, bwin may be derived by applying windowing to b. Other techniques may also be used.

Embodiments of the invention may further comprise determining a residual error signal (e) as indicated at 114. For example, e may be obtained from difference between the target impulse response (bwin) and optimized channel impulse response (b) in a time domain.

In some embodiments, the residual error signal e may be transformed to a frequency domain. For example, a frequency domain residual error signal E may be determined by performing a FFT on e as indicated at 116.

As indicated at 118, some embodiments may further comprise modifying the residual error signal E to get an interim value. For example, and interim value (eh) may be determined from an IFFT of EH*. Other methods are also possible.

Some embodiments may adjust an equalizer coefficient w. For example, as indicated at 120, w may be adjusted by subtracting the interim value (eh) from the value of w as set at step 102. In some embodiments, the interim value (eh) may be multiplied by the step size (u) prior to subtraction. Other methods are also possible.

Some embodiments may optimize the equalizer coefficient w. For example, as indicated at 122 windowing may be performed on w to determine an optimal value (wwin).

As indicated at 124, an optimized frequency based equalizer coefficient may be determined. For example, transforming wwin via an FFT may yield an optimized frequency based equalizer coefficient W. Other techniques may also be used.

As indicated at 126, the above described method may be iterated a suitable number of times (e.g., 128) in order to accomplish training of all iterations. Furthermore, as indicated at 128 division-free (or other) normalization may be performed on w. Finally, as indicated at 130, a frame boundary may be obtained.

FIG. 2 is a schematic flow diagram of a method for training a TEQ according to some embodiments of the prior art. As shown, the process (indicated generally at 200) typically initiates as indicated at 202 by setting an equalizer coefficient variable (w) to an initial value (e.g., w=w0). As indicated at 204, performing an FFT on w generates a frequency-based value W.

The process includes transforming the received channel (Y), as indicated at 206. Typically, transformation of Y is by FFT. Once Y is transformed, the method includes determining a target value for the frequency response of the channel (B) as indicated at 208. For example, B may be determined by B=WYX*/|xx*|.

As indicated at 210, B is transformed to a time domain. For example, an IFFT is used to transform B to a time based domain value (b).

Windowing techniques are then used to optimize b. For example, as indicated at 212, bwin may be derived by applying windowing to b.

A frequency based value (B) is then determined as indicated at 214. For example, B may be determined from B-FFT(bwin).

Then an error signal E is determined. For example, E is determined by E=WY−BX as indicated at 216.

Then an equalizer coefficient W is adjusted. For example, as indicated at 218, W is adjusted by W=W−uEY*.

As indicated at 220, w is derived from transforming W. For example, w=IFFT(W).

Then, as indicated at 222, w is optimized using windowin. For example, wwin=window (w).

Finally, wwin is transformed to yeild W. For example, as indicated at 224, W=FFT(wwin). The process is repeated as necessary as indicated at 226 until the process terminates as indicated at 228.

As discussed above, one advantage of the method shown in FIG. 1 over that shown FIG. 2 is that memory-usage is dramatically saved. For example, in the design shown in FIG. 2, three-symbol buffer memory is required to store W, Y, and E where W, Y, and E are the FFT results of w, y, and e, respectively, and y is the received signal. In the present invention (FIG. 1), only two-symbol buffer memory is needed to store E and H, where H is the frequency-response of the channel.

In addition, the present invention enables the computational work to be reduced. For example, the length of W is usually half of the FFT size, which is much larger than the length of w in a time domain. Therefore, updating TEQ coefficients in time domain directly requires less computational work than updating W in a frequency domain. Other advantages will be apparent to those skilled in the art.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

We claim:

1. A method for determining equalizer coefficients for channel equalization in Discrete-Multi-Tone based Digital Subscriber Line systems, the method comprising:
   determining an impulse response value in a time domain;
   applying windowing to the impulse response value to determine a windowed impulse response value;
   determining a residual error signal based upon the windowed impulse response value; and
   adjusting an equalizer coefficient by an amount that is based upon the residual error signal;
   wherein determining a residual error signal further comprises determining the difference between the impulse response value and the windowed impulse response value.

2. The method of claim 1 wherein determining the residual error signal further comprises subtracting the windowed impulse response value from the impulse response value.

3. The method of claim 1 wherein adjusting an equalizer coefficient further comprises:
   transforming the residual error signal to a frequency domain to generate a transformed residual error signal;
   modifying the transformed residual error signal by an estimated channel response value to form an interim value;
   transforming the interim value to a time domain to generate a correction factor; and
   adjusting the equalizer coefficient by an amount proportional to the correction factor.

4. The method of claim 3 wherein the transforming the residual error signal to a frequency domain to generate a transformed residual error signal further comprises transforming the residual error signal via a Fast Fourier Transform.

5. The method of claim 3 wherein the transforming the interim value to a time domain to generate a correction factor further comprises transforming the interim value via an Inverse Fast Fourier Transform.

6. The method of claim 3 wherein the amount proportional to the correction factor is determined at least in part by multiplying the correction factor by an amount proportional to a step size.

7. A system for determining equalizer coefficients for channel equalization in Discrete-Multi-Tone based Digital Subscriber Line systems, the system comprising:
   an impulse response module for determining a impulse response value in a time domain;
   a windowing module for applying windowing to the impulse response value to determine a windowed equalized impulse response value;
   a residual error module for determining a residual error signal based upon the windowed impulse response value; and
   an equalizer coefficient module for adjusting an equalizer coefficient by an amount that is based upon the residual error signal;
   wherein the residual error module further comprises a difference module for determining the difference between the impulse response value and the windowed impulse response value.

8. The system of claim 7 wherein the residual error module further comprises a subtraction module for subtracting the windowed impulse response value from the impulse response value.

9. The system of claim 7 wherein the equalizer coefficient module further comprises:
   a first transformation module for transforming the residual error signal to a frequency domain to generate a transformed residual error signal;
   a modification module for modifying the transformed residual error signal by an estimated channel response value to form an interim value;
   a second transformation module for transforming the interim value to a time domain to generate a correction factor; and
   wherein the equalizer coefficient module adjusts the equalizer coefficient by an amount proportional to the correction factor.

10. The system of claim 9 wherein the transforming the residual error signal to a frequency domain to generate a transformed residual error signal further comprises transforming the residual error signal via a Fast Fourier Transform.

11. The system of claim 9 wherein the transforming the interim value to a time domain to generate a correction factor further comprises transforming the interim value via an Inverse Fast Fourier Transform.

12. The system of claim 9 wherein the amount proportional to the correction factor is determined at least in part by multiplying the correction factor by an amount proportional to a step size.

13. A method for determining equalizer coefficients for channel equalization in Discrete-Multi-Tone based Digital Subscriber Line systems, the method comprising:
   determining a impulse response value in a time domain;
   applying windowing to the impulse response value to determine a windowed impulse response value;
   determining a residual error signal based upon the windowed impulse response value; and
   adjusting an equalizer coefficient by an amount that is based upon the residual error signal;
   wherein adjusting an equalizer coefficient further comprises:
   transforming the residual error signal to a frequency domain to generate a transformed residual error signal;
   modifying the transformed residual error signal by an estimated channel response value to form an interim value;
   transforming the interim value to a time domain to generate a correction factor; and adjusting the equalizer coefficient by an amount proportional to the correction factor.

14. The method of claim 13 wherein determining the residual error signal further comprises subtracting the windowed impulse response value from the impulse response value.

15. The method of claim 13 wherein the transforming the residual error signal to a frequency domain to generate a transformed residual error signal further comprises transforming the residual error signal via a Fast Fourier Transform.

16. The method of claim 13 wherein the transforming the interim value to a time domain to generate a correction factor further comprises transforming the interim value via an Inverse Fast Fourier Transform.

17. The method of claim 13 wherein the amount proportional to the correction factor is determined at least in part by multiplying the correction factor by an amount proportional to a step size.

18. A system for determining equalizer coefficients for channel equalization in Discrete-Multi-Tone based Digital Subscriber Line systems, the system comprising:
   an impulse response module for determining a impulse response value in a time domain;
   a windowing module for applying windowing to the impulse response value to determine a windowed equalized impulse response value;
   a residual error module for determining a residual error signal based upon the windowed impulse response value; and
   an equalizer coefficient module for adjusting an equalizer coefficient by an amount that is based upon the residual error signal;
   wherein the equalizer coefficient module further comprises:
   a first transformation module for transforming the residual error signal to a frequency domain to generate a transformed residual error signal;
   a modification module for modifying the transformed residual error signal by an estimated channel response value to form an interim value;
   a second transformation module for transforming the interim value to a time domain to generate a correction factor; and
   wherein the equalizer coefficient module adjusts the equalizer coefficient by an amount proportional to the correction factor.

19. The system of claim 18 wherein the residual error module further comprises a subtraction module for subtracting the windowed impulse response value from the impulse response value.

20. The system of claim 18 wherein the transforming the residual error signal to a frequency domain to generate a transformed residual error signal further comprises transforming the residual error signal via a Fast Fourier Transform.

21. The system of claim 18 wherein the transforming the interim value to a time domain to generate a correction factor further comprises transforming the interim value via an Inverse Fast Fourier Transform.

22. The system of claim 18 wherein the amount proportional to the correction factor is determined at least in part by multiplying the correction factor by an amount proportional to a step size.

* * * * *